United States Patent [19]

Greene

[11] 4,185,837

[45] Jan. 29, 1980

[54] FLUID SEAL WITH LUBRICATED SEALING SURFACES

[76] Inventor: Jerome Greene, 1241 Barclay Ct., Westlake Village, Calif. 91361

[21] Appl. No.: 902,947

[22] Filed: May 5, 1978

[51] Int. Cl.² ............................................. F16J 15/12
[52] U.S. Cl. ...................................... 277/27; 277/30; 277/31; 277/235 R
[58] Field of Search ...................... 277/27, 31, 235, 30

[56] References Cited

U.S. PATENT DOCUMENTS

| | | | |
|---|---|---|---|
| 2,819,099 | 1/1958 | Rittle | 277/235 |
| 2,860,895 | 11/1958 | Hosbacher | 277/27 |
| 3,179,422 | 4/1965 | Phillips | 277/27 |
| 3,587,734 | 6/1971 | Shaffer | 277/31 |
| 4,022,424 | 5/1977 | Davis et al. | 277/30 |
| 4,098,341 | 7/1978 | Lewis | 277/31 |

*Primary Examiner*—Robert I. Smith

*Attorney, Agent, or Firm*—Baco & Thomas

[57] ABSTRACT

A fluid seal for sealing against leakage between relatively moving machine elements, capable of establishing a lubricant film between sealing surfaces in sliding contact without affecting sealing and accomplishing pressure balancing of the seal so that the pressure at the sealing surfaces is substantially less than the sealed pressure, includes as its essential elements an elastomer sealing surface with shaped rigid members embedded therein in sliding contact with a rigid sealing surface. The shape of the embedded rigid members enables formation and continued generation of the lubricant film and pressure balancing of the seal by controlling the deformation of the elastomer surface when the latter is subjected to the sealed pressure and friction at the sliding surfaces. The seal can be formed both as a radial type seal with annular sealing surfaces and as an axial type seal with flat sealing surfaces.

10 Claims, 6 Drawing Figures

FLUID SEAL WITH LUBRICATED SEALING SURFACES

FIELD OF THE INVENTION

The invention relates to sealing devices used to prevent leakage of fluid between relatively moving machine elements.

BACKGROUND OF THE PRIOR ART

Sealing devices in common use for sealing against fluid leakage between relatively moving machine elements have performance limitations and operational disadvantages. The elastomeric radial type lip seal utilizes an extremely narrow lip contact area and a tight fit around a shaft circumference in order to effectively seal. The seal pressure increases the tightness of the fit. The resulting high pressure loadings at the sealing surfaces prevents the formation of a lubricant film. High sealed pressures and sliding speeds are severely limited, as the sliding friction causes rapid destruction of the sealing surfaces. Mechanical axial flat face seals have relatively large sealing areas that effectively seal. However, the combination of the flat face and the large sealing area prevents the entrance of the sealed fluid between the sealing surfaces to form a lubricant film adequate for high sealed pressures and sliding speeds. The sliding friction generated by these operating conditions would destroy the sealing surfaces by wear and overheating. Low viscosity sealed fluids, such as water, are particularly deleterious to both the radial lip and axial face seals.

Open path labyrinth and externally pressurized sealing devices are used when the operating requirements are beyond the capability of sliding surface closed path seals. These seals also have performance limitations and disadvantages. The labyrinth seal requires an excessively long length to seal substantial pressures and is limited to applications where continuous leakage is acceptable and where a means for collecting and disposing of the leakage fluid is convenient and available. The externally pressurized sealing device blocks fluid leakage by admittance of a fluid pressurized by an external source into the leakage path. The pressurized fluid leaks both internally and externally. The fluid must be compatible with the system fluid and a means for disposing of the external leakage must be provided. The requirement for an external pressure source and the energy consumption are obviously undesirable.

What is needed is a closed path fluid seal that can operate over an unlimited range of sealed pressures, speeds, and sealed fluid viscosity. It is the object of this invention to provide such a fluid seal.

SUMMARY OF THE INVENTION

In accordance with the invention, a sealing device for sealing against fluid leakage between two relatively moveable machine elements is provided which comprises a uniquely constructed elastic (elastomer) sealing surface attached to one of the machine elements in sliding contact with a rigid sealing surface attached to the other machine element for the purpose of blocking the leakage path. The unique aspect of the construction of the elastomer sealing surface is the embeddment therein below and parallel to the sliding surface of a consecutive series of relatively rigid members particularly shaped to control the deformation of the elastomer surface when it is subjected to the sealed pressure and the friction forces at the sliding contact area so as to form a hydrodynamically pressurized lubricant film between the sliding surfaces and to reduce the pressure at the sealing surfaces substantially below that of the sealed pressure.

The seal assembly comprises a relatively thick ring of elastomer material bonded to a structural rigid member that is attached to the machine assembly in a manner to align the sealing surface of the elastomer material with the mating rigid sealing surface similarly supported by the machine assembly. The consecutive series of shaped rigid members are embedded in the elastomer material between its sealing surface and structural support members. The surfaces of the shaped members are bonded to the elastomer material so that no leakage path exists around the members.

The shape of the embedded rigid members is as follows. The surface of the members facing the sealing sliding surface of the elastomer (front surface) parallels the sealing surface. The surface of the members facing away from the elastomer sealing surface (back surface) is spherically or compound curved, with the center of curvature being located in the direction of the sealing surface. The sides of the members are normally straight (they can be curved), forming a square or rectangle. The surface of the structural support member adjacent the spherically curved surfaces on the shaped members is similarly curved, and the two surfaces are separated by a thin layer of elastically deformable material. An alternate embodiment utilizes extremely thin, alternate, curved laminates of elastomer and a relatively rigid material (metal) between the surfaces, the purpose of which will be explained later herein.

In accordance with the invention, the seal device can be formed as a radial type seal with a circular sealing surface or as an axial type seal with a flat surface.

By this unique sealing surface construction, as explained in detail below, a virtually indestructible lubricant film is formed between the sealing surface while maintaining effective sealing. As a result, the seal can operate over an unlimited range of sealed pressures, speeds, and sealed fluid viscosity with extended endurance. The invention is a major advancement in the state-of-the-art of sealing devices.

The invention can better be understood by reference to the appended drawings which illustrate radial and axial form of the invention, and which are explained in the following detailed description.

DETAILED DESCRIPTION OF PREFERRED EMBODIMENT

Figure 1:
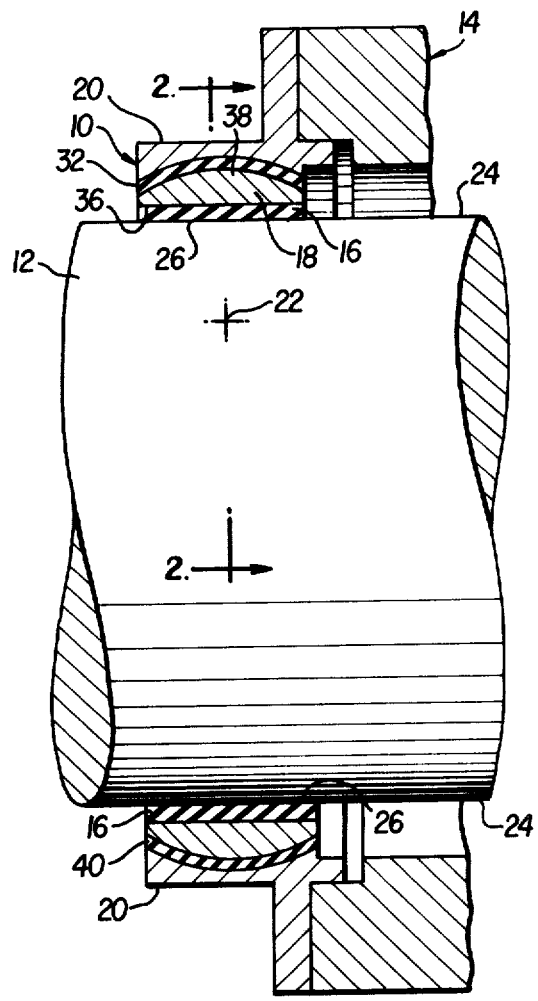
FIG. 1 is a side elevation in cross-section of a presently preferred form of the radial seal embodying the invention.
Figure 2:
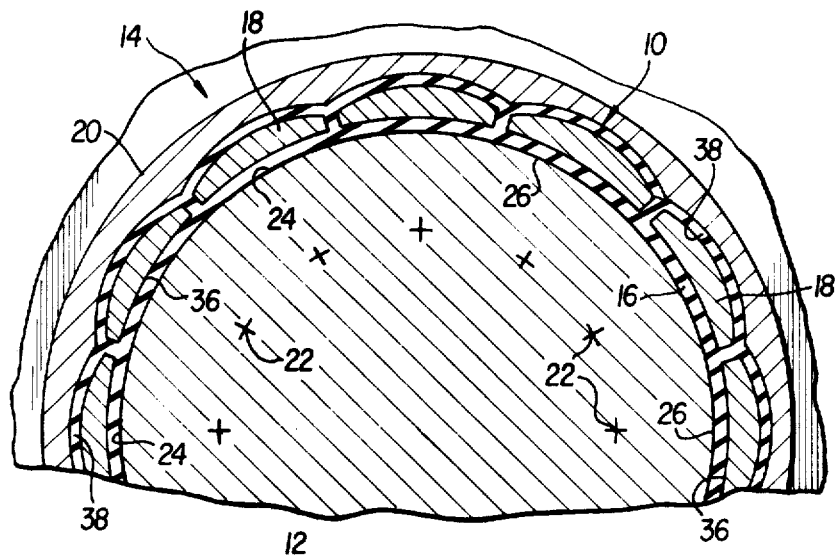
FIG. 2 is a fragmentary vertical sectional view taken along line 2—2 in FIG. 1.

With reference to the appended drawings, FIGS. 1 and 2, the radial form of the seal embodying the present invention is shown at 10 supported by housing of the machine 14 in sealing alignment with a rotating shaft 12, the shaft sealing surface 24 sliding on the elastomer sealing surface 26 of the seal 10. FIGS. 1 and 2 show the seal 10 at rest, that is, the shaft not rotating and no sealed pressure exists.

Figure 1A:
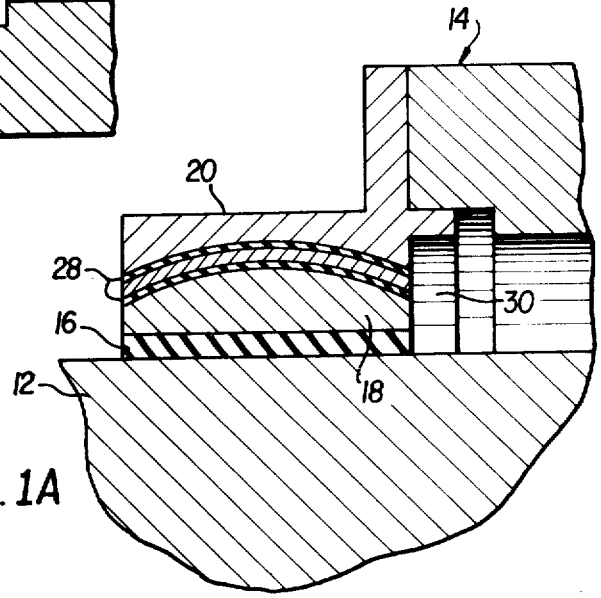
FIG. 1A shows an enlarged detail of an alternate embodiment of the seal.

The seal 10 consists of a relatively thick, continuous elastomer seal element in the form of a ring 16 with shaped rigid members 18 embedded in the ring between the elastomer sealing surface 26 and a structural support member 20 for the elastomer ring 16, the shaped members 18 being circumferentially spaced within the elastomer ring 16 (see FIG. 2) along the direction of relative motion between the shaft 12 and the housing 14. The surface 36 of the shaped members 18 facing the elastomer sealing surface 26 parallels the sealing surface 26. The surfaces 38 of the shaped members facing the structural support members 20 are convex spherically curved (they may be compound curved about different centers of curvature in planes normal to each other), with their respective centers of curvature 22 being located in the direction of the sealing surface 26 (on the same side of the ring 16 as the shaft 12), preferably between the rotational axis of the shaft 12 and the sealing surface 24. the surface 40 on the structural support ring 20 facing the spherical surface 38 on the shaped members 18 is concave spherically curved concentric with the convex spherically curved surface 38 on the shaped members 18, the surfaces 38 and 40 being separated by a thin section of elastically deformable material 32 that is part of (e.g., integral with) the elastomer ring 16. An alternate construction for this thin section of material is shown by FIG. 1A, wherein the thin elastomer section is divided into a number of thinner sections 28 spaced apart and bonded to rigid laminates 30. The elastomer ring 16 extends between the shaped members 18 to form a solid sealing ring. All the surfaces of the rigid members 20, 18, and 30 in contact with the elastomer ring 16 are bonded thereto.

Figure 3:
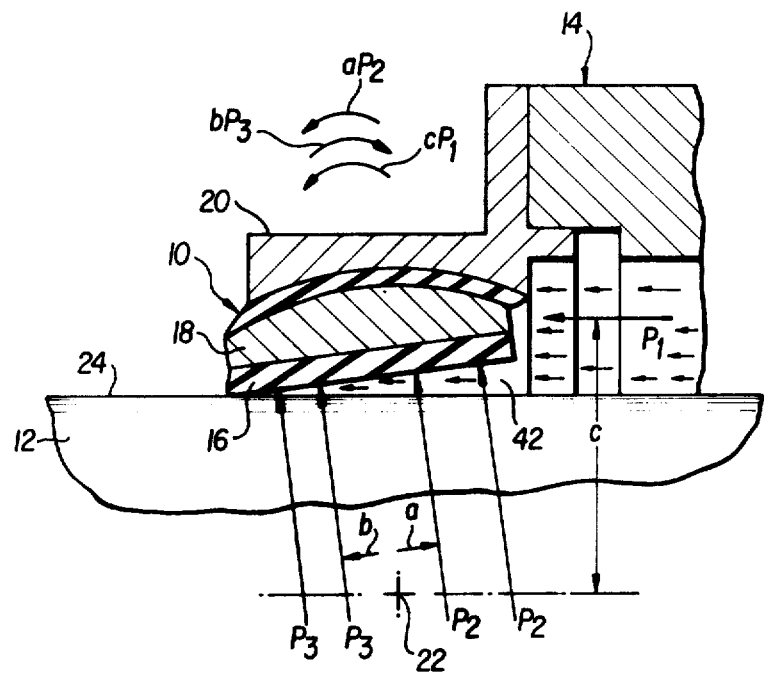
FIG. 3 is an enlarged detail view of the seal showing how it responds to the sealed pressure.
Figure 4:
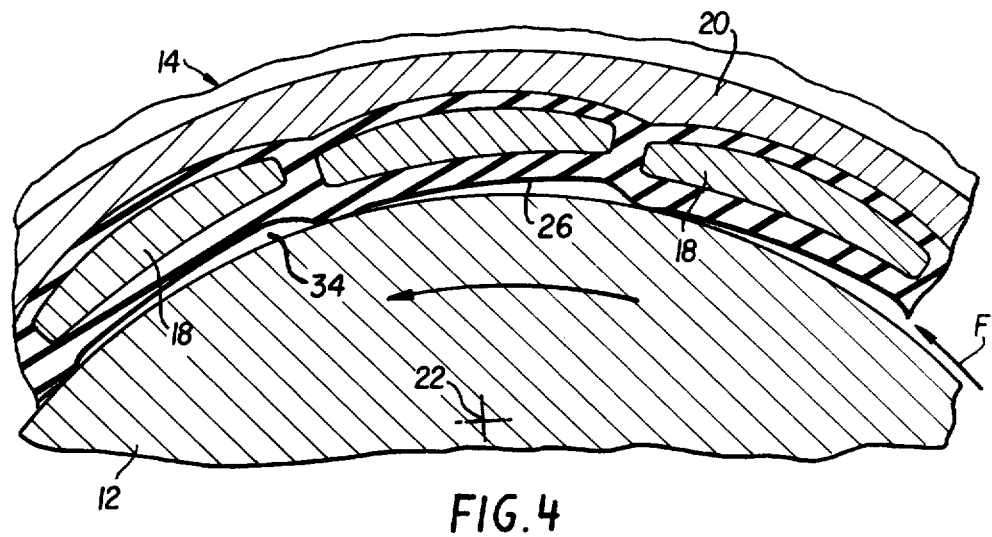
FIG. 4 is an enlarged detail view of the seal showing how it responds to the sliding friction forces at the sealing surfaces.

The operation of the invention shown in FIGS. 1 and 2 is represented in FIGS. 3 and 4. It is based on the natural physcial properities of an elastic material such as elastomers, and the control of its deformation by the embeddment of rigid members in the material. Similar to most engineering materials, elastomers are virtually incompressible, but deformable similar to springs (the modulus of elasticity of materials is actually a spring rate). Peculiar to elastomers is that the bulk compression stiffness is much greater than bulk shear stiffness and that for small deformations, the shear stiffness is independent of the compression stress. The compression/shear stiffness ratio is further increased by shaping the elastomer material so that the bulge area is small compared to the compression load area.

In the operation of the invention, the elastomer is deformed solely in the shear mode and, as the value of the shear deformation is minute (as described later herein), the shear stiffness forces resisting the deformation can be ignored during operation. As to control of the elastomer deformation in the invention, note in FIGS. 1 and 2 that the bulk area of the thin elastomer section 32 supporting the shaped rigid members 18 is small compared to the spherically curved area. Thus, the shaped members 18 are constrained from displacing in the radial (compression) directions, but can readily displace in the elastomer shear direction, that is, a swing-like motion around the center of the spherical curvature 22.

The gaps 42 and 34 formed by the displacement of the shaped members 18 is shown greatly exaggerated for clarity in FIGS. 3 and 4. These gaps represent the lubricant film that is formed between the sealing surfaces. Lubricant films formed between sliding surfaces are actually unperceptible, less than $10^{-3}$ inch thick (0.254 mm) for viscous fluids such as oils, and less than $10^{-4}$ inch thick (0.025 mm) for low viscosity fluids such as water. Likewise, the deformation of the elastomer to form these gaps is unperceptible, and thus the elastomer shear forces resisting the formation of the gaps can be ignored in the operation of the invention.

It is important to clarify the nature and character of a lubricant film between sliding surfaces. The lubricant film need not be any thicker than a boundary film to prevent surface contact under lightly loaded conditions. A few drops of lubricant is sufficient to form a boundary film and the leakage of a fluid between two surfaces in sliding contact with boundary lubrication is negligible. However, when the sliding velocity is high, the heat generated by the viscous shear can destroy the lubricant film and the surfaces. The simplest method for preventing overheating is to flush the sliding surfaces with cool lubricant. This normally results in substantial leakage between sealing surfaces. Furthermore, high loadings between the surfaces makes it difficult to admit the cooling lubricant.

Proceeding with the description of the operation of the invention, FIG. 3 shows how the sealed pressure simultaneoulsy activates sealing and the admission of the sealed fluid for lubrication purposes between the sealing surfaces. The sealed pressure moment $cP_1$ causes the shaped member 18 to swing in direction to simultaneously lift the internal edge of the sealing surface admitting the sealed fluid between the sealing surfaces and compressing the external edge to actuate sealing. The fluid pressure profile in the gap 42 (exaggerated for clarity in FIG. 3) is a function of the value of the sealed pressure and the gap geometry. Pressure moments $aP_2$ within the gap will add to the swing motion of member 18. Pressure moments $bP_3$ and the moments of the forces at the sealing surfaces will subtract from the swing motion. The shaped member 18 will stabilize in the sealing position when the moments are in equilibrium. The compression of the elastomer surface and the sealing area between the sealing surfaces (elastomer area in contact with shaft) both increase with increasing sealing pressures, thus increasing sealing and decreasing the pressure loading at the sealing area. This method of "pressure balancing" in the invention is unique.

FIG. 4 shows how the sliding friction at the sealing surfaces actuates the formation of an adequate lubrication film between the sealing surfaces under operating conditions of high sealed pressures and rotational speeds. The drag from the friction forces displace the elastomer sealing surface 26 in the direction of motion, forcing the shaped members to swing about their respective centers of curvature 22 and to deform the sealing surface 26 from a smooth cylindrical surface into a wavy cylindrical surface pattern, the crests of the waves occurring at the side of each shaped member 18 in the direction of motion forming a lubricant film consisting of a consecutive series of wedge shapes converging in the direction of relative movement of the adjacent sealing surface 24. Hydrodynamic action generates pressure in the lubricant film, thus maintaining the film when the sealed pressures are high, and rotation circulates the lubricant for cooling. The combined deformation of the sealing surface 26 from the action of the sealed pressures and the friction forces results in fluid lubrication at the internal edge of the sealing surface (towards the pressure source) tapering to boundary lubrication at the external edge. Leakage is negligible. The motion of the shaft sealing surface 26 can be a combined rotating and axial motion without affecting sealing, a feature unique to the invention. The sealing surfaces can be reversed; that is, the elastomer sealing surfaces can be attached to the shaft and the rigid sealing surfaces fixed to the machine housing. The wedge shapes are shown exaggerated in FIG. 4 for clarity.

Figure 5:
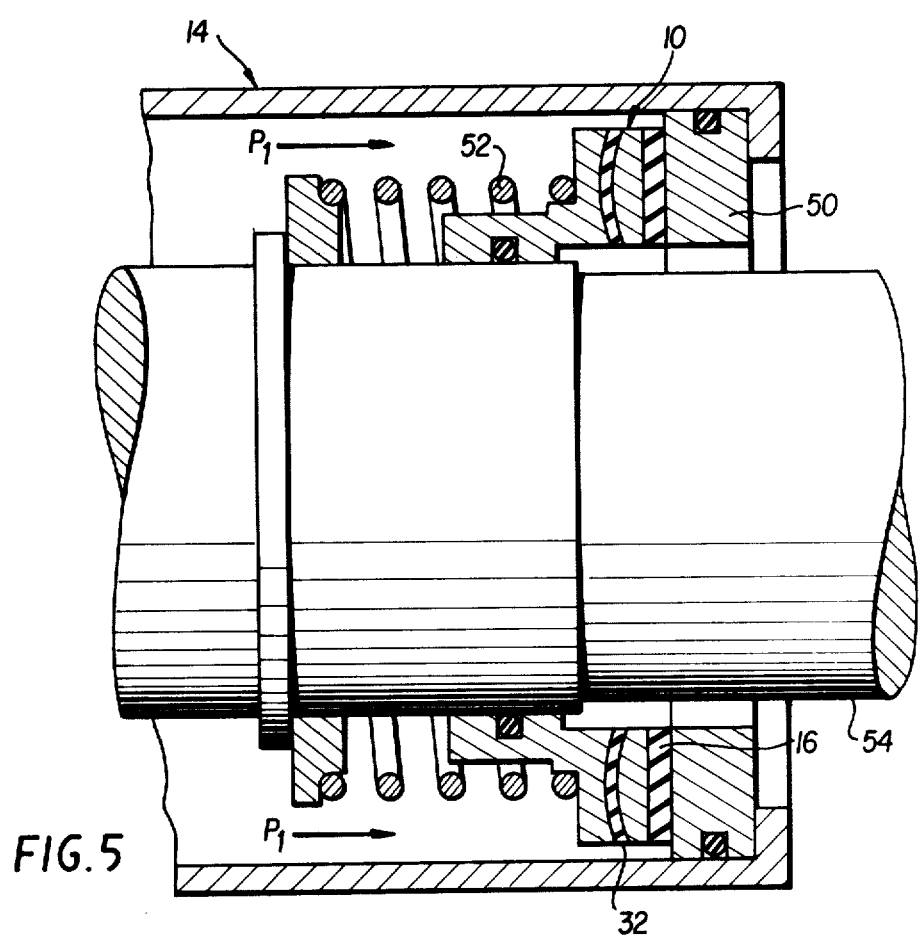
FIG. 5 is a side elevation view in cross-section of an alternate embodiment of the seal in the form of an axial type seal.

An alternate form of the invention is an axial seal with flat sealing surfaces as shown in FIG. 5. The basic principle of operation will not be repeated as it is identical to that of radial form of the invention, shown in FIGS. 3 and 4, except the lubrication film is formed between flat sealing surfaces in lieu of cylindrical surfaces. In FIG. 5, the sealing surface 26 lies in a single plane and is normally urged by spring 52 against the cooperating sealing surface on opposite member 50 fixed to machine housing 14. The seal assembly 10 in this embodiment may or may not rotate with shaft 54, and may or may not be slidable longitudinally along shaft 54.

Various forms of the invention and modifications to the illustrated specific exemplary embodiments can be made within the scope and spirit of the invention. The invention is not intended to be limited except by the express language of the following claims.

What is claimed is:

1. A seal for sealing against fluid leakage between a pair of relatively moving machine elements comprising a continuous elastomer seal connected in sealing relationship to one of the machine elements for movement therewith, the seal having a continuous elastomer layer including an elastomer sealing surface adapted to slidably engage a continuous rigid sealing surface on the other machine element; a plurality of shaped rigid members embedded in said elastomer layer beneath the elastomer sealing surface in a consecutive, closely spaced arrangement along the direction of relative movement between the machine elements; a support means for the elastomer layer; said support means including individual support surfaces located directly behind each of the shaped rigid members, each rigid member having a rear surface, each support surface and one adjacent rear surface of a rigid member defining a surface pair, each surface pair being curved about a mutual center or centers of spherical curvature that is or are located on a radius line extending towards the other machine element.

2. A seal according to claim 1, including a thin layer of substantially incompressible elastically deformable material between each of said surface pairs, said material providing a substantially rigid connection between each surface pair in a direction along the respective radius line of the pair in a compressive direction, while providing a resilient connection between each surface pair in directions parallel to the surfaces defining the surface pair.

3. A seal according to claim 2, said elastically deformable material comprising alternate thin layers of elastomer and relatively rigid material bonded together and extending parallel to the surface pairs, with a layer of elastomer material adjacent each support and rear surface, the support and rear surface each being bonded to the adjacent layer of elastomer material.

4. A seal for sealing against fluid leakage between relatively moving machine elements, the seal being adapted to be secured to one of and to extend between said machine elements, the seal comprising a continuous elastomeric seal element having a front elastomer sealing surface adapted to cooperate with an adjacent continuous rigid sealing surface on the respective opposite machine element; a plurality of shaped rigid members embedded in said seal element beneath said elastomer sealing surface and spaced apart along the length of said seal element along the direction of relative motion between said machine elements, said rigid members having front surfaces that extend parallel to said elastomer sealing surface and rear surfaces that are convexly curved about respective centers of curvature located on radius lines extending towards the other machine element; and a support means for said elastomeric seal element located behind said rigid members, said elastomeric seal engaging said support means in sealing relationship, said support means including concave curved support surfaces corresponding in number to and lying directly behind but spaced from said rear surfaces of said rigid members, each of said curved support surfaces extending parallel to a respective rear surface of one of said rigid members; a layer of elastically deformable material comprising part of said elastomeric seal element located between each of said rigid members and its respective support surface; said layer of elastically deformable material providing stiff support for said rigid members in a radial sense with respect to the respective centers of curvature of said rear surfaces of said rigid members while enabling said rigid members to move in directions parallel to said rear surfaces; whereby said elastomer sealing surface is deformed in a predetermined manner in operation to permit lubrication of said sealing surfaces by fluid being sealed while maintaining effective sealing against leakage.

5. A pressure seal according to claim 4, wherein said elastically deformable material located between the rigid members and their respective support surfaces is a composite bonded assembly of thin layers of alternate elastomer and non-elastomer material extending parallel to the rear and support surfaces, with elastomer layers in contact with the rigid members and the support surfaces.

6. A fluid pressure seal in accordance with claim 4 or 5, wherein said rigid members are substantially thicker from front to rear than the thickness of the elastomer material disposed in front of and the elastically deformable material located rearwardly of the rigid members.

7. A fluid pressure seal in accordance with claim 4 or 5, wherein the said rear surfaces of said rigid members are spherically curved surfaces.

8. A fluid pressure seal in accordance with claim 4 or 5 wherein said rear surfaces of said rigid members are compound curved about two centers of curvature in planes normal to each other.

9. A fluid pressure seal in accordance with claim 4 or 5, said elastomer sealing surface being annular shaped.

10. A fluid pressure seal in accordance with claim 4 or 5, said elastomer sealing surface lying in a single plane.

* * * * *